(12) United States Patent
Kort

(10) Patent No.: US 8,031,705 B2
(45) Date of Patent: Oct. 4, 2011

(54) BUS INTERFACE UNIT FOR INTERPOSING IN A TWO-WIRE CURRENT LOOP, AS WELL AS A TRANSDUCER, POSITION CONTROLLER AND ANALOG INPUT AND OUTPUT MODULE WITH SUCH A BUS INTERFACE UNIT

(75) Inventor: Valentin Kort, Landau (DE)

(73) Assignee: Siemens Aktienegesellschaft, Munich (DE)

( * ) Notice: Subject to any disclaimer, the term of this patent is extended or adjusted under 35 U.S.C. 154(b) by 536 days.

(21) Appl. No.: 12/288,506

(22) Filed: Oct. 21, 2008

(65) Prior Publication Data

US 2009/0110039 A1    Apr. 30, 2009

(30) Foreign Application Priority Data

Oct. 22, 2007   (EP) .................................... 07020647

(51) Int. Cl.
*H04L 12/50* (2006.01)
(52) U.S. Cl. ......................................... 370/359; 361/18
(58) Field of Classification Search .................. 370/359, 370/463
See application file for complete search history.

(56) References Cited

U.S. PATENT DOCUMENTS

| 4,888,764 A | 12/1989 | Haug |
| 5,084,868 A * | 1/1992 | Kelly et al. ................... 370/482 |
| 2008/0013226 A1 * | 1/2008 | Kirst ............................... 361/18 |

FOREIGN PATENT DOCUMENTS

| EP | 0 365 696 A1 | 5/1990 |
| WO | WO 92/13411 | 8/1992 |

* cited by examiner

*Primary Examiner* — Hassan Kizou
*Assistant Examiner* — Emmanuel Maglo

(57) ABSTRACT

A bus interface unit is provided for intermediate switching in a two-wire current loop, wherein the bus interface unit has a transformer for potential-free decoupling of an alternating current signal modulated with digital receive data and/or for coupling in of an alternating current signal to be modulated with digital send data. The alternating current signal is modulated onto a direct current signal of a two-wire current loop. The bus interface unit has a bidirectional modem unit connected on the secondary side to the transformer for output of the receive data on a data bus and for input of the send data from the data bus. The transformer has two primary windings, which are interconnected such that the magnetic fields generated by the two-wire loop current flowing through it cancel each other out. A lowpass and/or a highpass filter for the alternating current signal is connected upstream from the at least one primary winding.

20 Claims, 3 Drawing Sheets

BUS INTERFACE UNIT FOR INTERPOSING IN A TWO-WIRE CURRENT LOOP, AS WELL AS A TRANSDUCER, POSITION CONTROLLER AND ANALOG INPUT AND OUTPUT MODULE WITH SUCH A BUS INTERFACE UNIT

CROSS REFERENCE TO RELATED APPLICATIONS

This application claims priority of European Patent Office application No. 07020647.9 EP filed Oct. 22, 2007, which is incorporated by reference herein in its entirety.

FIELD OF INVENTION

The invention relates to a bus interface unit for interposing in a two-wire current loop, with the bus interface unit having a transformer for isolated decoupling of a digital alternating current signal modulated with digital receive data clock signal and/or for coupling in an alternating current signal to be modulated with digital transmit data. The alternating current signal is modulated onto a direct current signal, known as the "normal signal", of a two-wire loop current. The bus interface unit has a bidirectional modem unit connected to the secondary side of the transformer for outputting the receive data on a data bus and for inputting the send data from the data bus.

The invention further relates to a transducer, a position controller and also to an analog input module and an analog output module, which each feature at least one such bus interface unit.

BACKGROUND OF INVENTION

In the simplest case the bus interface unit is a circuit board with corresponding inputs and outputs for connection to the two-wire current loop and to a data bus. The modem unit of the bus interface unit can for example be a CAN bus interface with a CAN bus transceiver, an I$^2$C interface or quite generally a serial or parallel interface. The modem unit can for example be a compact integrated electronic component.

The transducer and the position controller are typically employed in plant and automation technology, especially in the chemical industry, petrochemicals and mining. The analog input module as well as the analog output module are especially provided for plugging into a control center computer or process computer. The latter can for example be Personal Computers (PC). Alternatively the analog input and output modules can be components of a Programmable Logic Controller (PLC). They can alternatively be embodied as decentralized input and/or output components for fitting to a top-hat rail.

Transducers, such as type SITRANS P from Siemens, and also position controllers, such as type SIPART PS2 from Siemens, are operated for transmission of a measured value or a setpoint value to a two-wire current loop. Such a transducer and position controller is also supplied with electrical energy for feeding the electronic switching circuits via the same two-wire current loop. The feeding distant end can be an analog input module or an analog output module of a control center computer, a process computer or a PLC.

A position controller is usually a device for positioning valves in automation technology. It is primarily used in the process industry in order to check the production sequences. The position controller can have a linear drive or a rotation drive, to enable it to actuate linked system components, such as pushers, brake elements, air valves and such like. In general a position controller converts an electrical input signal into a corresponding output signal. Furthermore all position controller types have position feedback which serves to determine the actual position.

The range of measured values of a measured value to be transmitted, such as a temperature, a force, a pressure value or similar, is usually transferred in an assigned current value range of the two-wire current loop of 4 mA to 20 mA (4/20 mA Standard). The impressed current involved is a direct current. The range of measured values to be transmitted is mapped in such cases into a current value range of 16 mA, so that a permanent power supply of the signal circuit of the transducer and of a sensor or an actuator connected to it, such as of a valve, of the position controller is possible.

The direct current or normal signal transmitted over the two-wire current loop is relatively insensitive to electromagnetic disturbances. The maximum length of the two-wire current loop, with corresponding compensation of the line losses, meaning with corresponding raising of feed voltage, can amount to 1000 m and more. At least one measurement resistance in the range 50 to 250 Ohm is connected in the two-wire current loop. This is needed for the transducer in order to impress a current value corresponding to the measured value into the two-wire current loop by means of a closed control loop. With the position controller this measurement resistance is needed to enable the setpoint value transmitted by the analog output module to be read out. The same also applies for an analog input module or analog output module.

The analog field bus standardized on the basis of the 4/20 mA two-wire current loop can be expanded using a so-called HART® (Highway Addressable Remote Transducer) communication. HART® is a standardized, widely-used communication system for setting up industrial digital field busses. It allows digital communication between a number of user (field devices) over a common digital field bus via the two-wire current loop according to the older 4/20 mA standard. Existing lines according to the 4/20 mA standard can be used directly and both systems can be operated in parallel.

In accordance with the HART® protocol an alternating current signal with a current amplitude in the range of 0.8 mA to 1 mA is modulated onto the standard signal, i.e. the direct current signal of the two-wire loop current. The modulation is undertaken by means of an FSK (Frequency-Shift-Keying) method.

In such cases, for the binary 0/1 sequence of a data word to be transmitted, a modulation frequency of 2200 Hz for the value "0" and 1200 Hz for the value "1" is used according to its binary values. To guarantee a reliable reception, in accordance with the HART®-protocol an overall resistance of the two-wire current loop inclusive of the line resistance in the range between 230 Ohm and 1100 Ohm is specified.

Because of the spatial distribution and different feeding of the field devices, such as the transducers and position controllers for example, a potential separation between the two-wire current loop and the data bus side of the bus interface unit is frequently necessary. This avoids possible negative influences on the data transmission, such as inductive coupling-in earth loops or EMC couplings into the current loop.

Usually a transformer is used for potential separation. From the technical standpoint this is a transformer with one or more primary-side or secondary-side windings. In such cases the loop current flows permanently with its predominant direct current component in the range of 4 mA to 16 mA through the primary winding and magnetizes the core of the transformer. The transformer core is thus to be designed for the maximum loop current in respect of signaling transmission behavior. The exterior dimensions of the transformer are correspondingly large by comparison with the integrated modem unit.

SUMMARY OF INVENTION

An object of the invention is thus to specify a compact bus interface unit.

A further object of the invention is to specify a suitable transducer and position controller as well as a suitable analog input module and an analog output module.

The objects of the invention are achieved by a bus interface unit, a position controller and an analog interface module for a control center computer according to the independent claims. Advantageous embodiments of the bus interface unit are specified in the dependent claims.

The transformer features at least two primary windings, which are connected to each other such that the magnetic fields generated by the two-wire loop current flowing through the transformer cancel each other out. At least one of the primary windings has a lowpass filter and/or a highpass filter connected upstream from it for the alternating current signal.

The primary winding is connected as a bifilary winding in which the magnetic fields generated cancel each other out. The transformer preferably has two primary windings and preferably one secondary winding. This means that there is no magnetization of the transformer core by the relatively much greater direct current component of the loop current. The effect of the lowpass filter and/or the highpass filter is that the alternating current component of the loop current mainly flows only through one of the primary windings. The transformer core must only be designed in respect of magnetization for the alternating current component and not for the direct current component of the loop current. Consequently a transformer core significantly smaller in its dimensions can be used for signal transmission.

An advantage is that the bus interface unit has significantly more compact dimensions with this type of transformer and filter.

The size of the transformer core is governed by the created maximum allowed magnetic flux density $B_{MAX}$. For loop currents exceeding this value the transformer core then goes into magnetic saturation, in which no significant signal transmission from the primary side to the secondary side and in the reverse direction is possible any longer.

The magnetic flux density $B_{MAX}$ can be calculated in accordance with the Formula $$B_{MAX}=(L \times \hat{I})/(N \times A_{MIN})$$

with L being the inductance, $\hat{I}$ the peak current, N the number of windings and $A_{MIN}$ the minimum core cross section.

It can be seen from the formula that the magnetic flux density $B_{MAX}$ is proportional to the peak current $\hat{I}$. The current-compensated structure and the winding arrangement reduces the peak current $\hat{I}$ to the level of 20.8 mA (=20 mA direct current component+0.8 mA alternating current component of the loop current) to 0.8 mA. The ratio of the permitted peak currents $\hat{I}$ to each other amounts to 26. Since the volume of a transformer is generally proportional to the square of the core cross section $A_{MIN}$, the Ü transformer can basically be 676=262 times smaller in its dimensions. In practice the volume reduction, especially because the conductor cross section of the primary and secondary windings does not change in this case, can be far below this. Despite this, the volume reduction which will be in the single-digit or double-digit range, advantageously results in significant savings in space, weight and costs for the bus interface unit.

According to a preferred embodiment the lowpass filter is a choke. The choke is preferably designed for the "HART®"-frequencies in the range of 1200 Hz to 2200 Hz, meaning that for these frequencies by comparison with the frequency 0 Hz of the direct current signal of the loop current it is high impedance and thus blocking. Preferably it has a ferrite core, such as an annular core for example, which is wound with a wire winding.

According to an alternate embodiment a resistor is connected upstream in each case from the at least two primary windings. A capacitor is connected in parallel to one of the resistors, which with the parallel-connected resistor forms the highpass filter. The two resistors typically have the same resistance value. For the case considered in which no capacitor is yet present, basically no magnetization of the transformer core occurs, either through the direct current component or through the alternating current component of the current loop. The magnetic fields created in the primary winding cancel each other out. Only the parallel connection of a condenser in parallel to one of the resistors causes at least a part of the alternating current signal to be able to pass this resistor in parallel in accordance with a highpass. The impedance of the two resistors in particular amounts to a multiple of the impedance of the capacitor.

Preferably the alternating current signal, in accordance with a further embodiment, has a current amplitude of max. 1 mA, especially of appr. 0.8 mA. In particular the alternating current signal has an FSK frequency of 1200 Hz or 2200 Hz in accordance with the binary values of the serial sequence of the digital receive or transmit data. According to a preferred embodiment the bidirectional data transmission is based on a HART standard protocol.

According to a further embodiment the two-wire current loop is intended for transmission of a measured value or of a setpoint value, of which the respective measured value range is able to be mapped by correspondingly impressed direct current values of the loop current in a range of 4 mA to 20 mA.

The object of the invention is further achieved by a transducer. It is intended to be connected to a two-wire current loop with a measured value input for a measured value to be transmitted over the two-wire current loop. The transducer has a current regulator for impressing direct current values of the loop current corresponding to the measured value into the two-wire current loop. The transducer has at least one bus interface unit of this type connected in series to the current regulator. This is connected in particular to a data bus of the transducer. The integration of the inventive bus interface unit into the transducer allows its module to be greatly reduced in size. Preferably the current regulator for conventional analog output of the measured values and the inventive bus interface unit are arranged on a common circuit board. Typically a higher-ranking control unit of the transducer is connected to the bus interface unit for the exchange of data, such as diagnostic or configuration data for example, via a data bus, such as via the data bus of a microcontroller as control unit.

In a corresponding manner the object is achieved by a position controller for connection to a two-wire current loop and with a setpoint value output for outputting a setpoint value mapped via the two-wire current loop in the form of a current value. The position controller has a downstream current measurement/energy decoupling unit connected in series with the two-wire current loop for measurement of direct current values of the loop current as well as for energy supply to an actuator of the position controller. Inventively the position controller features at least one such bus interface unit connected downstream in series with the current measurement/energy decoupling unit. The latter is especially connected to a data bus of the position controller. Typically here too a superordinate control unit is connected via the data bus for exchange of data with the bus interface unit.

The object is further achieved by an analog input module for a control center computer, which features a current measurement recording unit for recording the measured value transmitted over a two-wire current loop. Inventively the analog input module has at least one such bus interface unit connected downstream in series to the current measurement recording unit. In particular this is able to be connected to the data bus of the control center computer. The analog input module can for example be a plug-in card, which can be inserted into a corresponding slot of the control center computer. Alternatively the input module can be a modular decentralized input unit for fitting to a top-hat rail.

Finally the object is achieved by an analog output module for a control center computer which has a controllable current source for impressing a setpoint value to be transmitted over a two-wire current loop. Inventively the analog output module features at least one such bus interface unit connected downstream in series with the controllable current source. In particular this is able to be connected to the data bus of the control center computer of the previous embodiment.

In addition an inventive analog input module and an analog output module can form a common analog input/output module or a common modular decentralized input//output chip.

BRIEF DESCRIPTION OF THE DRAWINGS

The invention, as well as advantageous embodiments of the invention will be explained in greater detail below with reference to the following figures. The figures show.

DETAILED DESCRIPTION OF INVENTION

Figure 1:
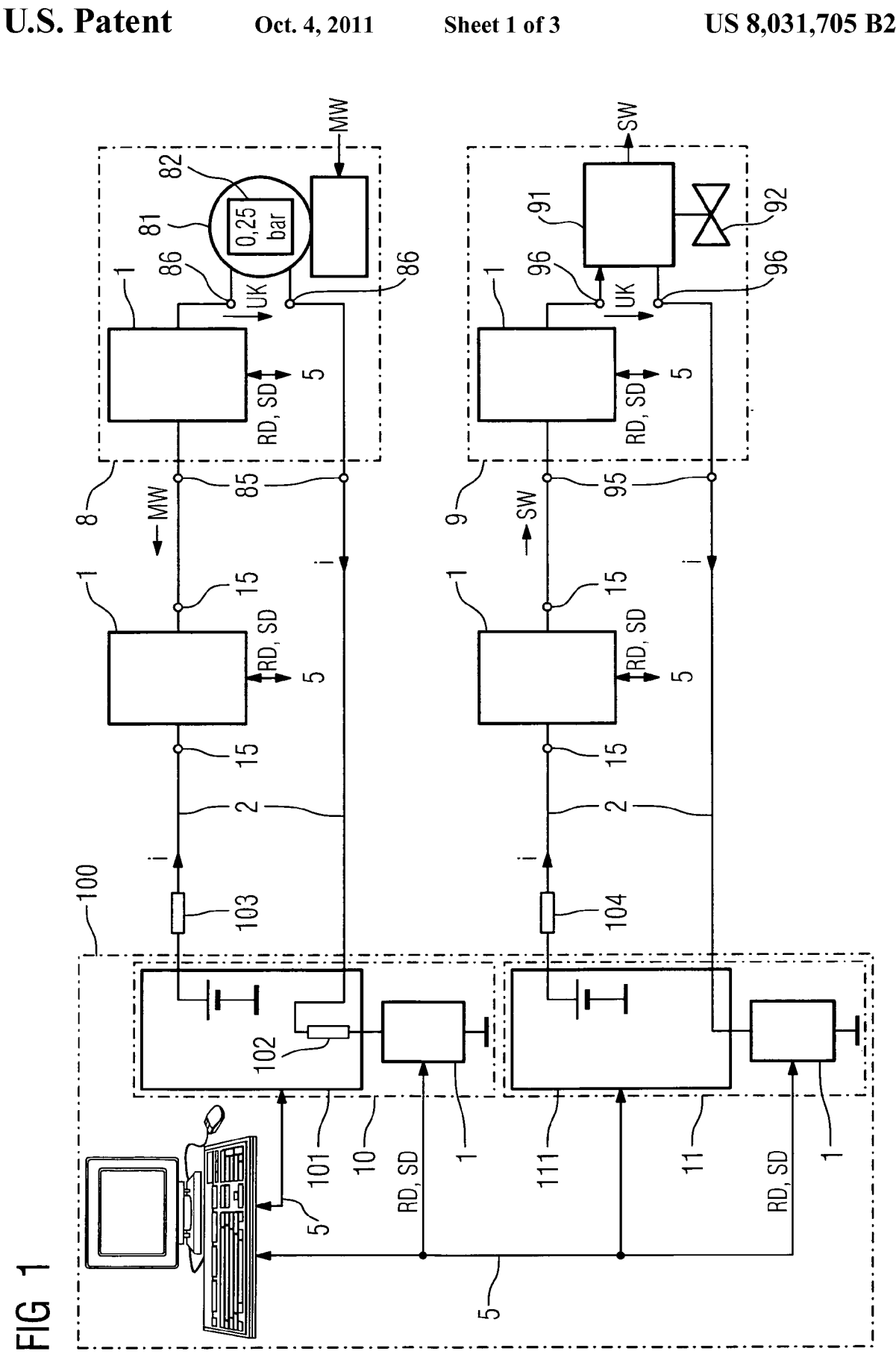
FIG. 1 a typical control system with a control center computer and an inventive transducer and position controller connected to said computer as well as two inventive bus interface units and an analog input module and output module, FIG. 2 an example of a timing curve of an analog direct current signal of a two-wire loop current overlaid by an alternating current signal, FIG. 3 a basic circuit diagram of a bus interface unit according to the prior art, FIG. 4 a basic circuit diagram of an inventive bus interface unit in accordance with a first embodiment and FIG. 5 a basic circuit diagram of an inventive bus interface unit in accordance with a second embodiment.

FIG. 1 shows an example of a control system with a control center computer 100 and an inventive transducer 8 and position controller 9 connected to it, as well as two inventive bus interface units 1 and an analog input module 10 and output module 11.

The control center computer 100 is shown in the left-hand part of FIG. 1. As shown, this can be Personal Computer for example. Alternatively, instead of a control center computer 100, a process computer or a Programmable Logic Controller (PLC) can be the central control element of the control system.

The control center computer 100 shown typically has an inventive analog input module 10 as well as an inventive analog output module 11. The analog input module 10 has a current measurement/energy supply unit 101 for recording the measured value MW transmitted over the upper two-wire current loop 2 shown and for supplying energy to a connected transducer 8. The measured value range of the measured value MW is mapped by correspondingly impressed direct current values of the loop current I in a range from 4 mA to 20 mA. Furthermore the analog input module 10 has an inventive bus interface unit 1 connected downstream in series with the current measurement/energy supply unit 101. For energy supply the current measurement/energy supply unit 101 has a current source indicated by the battery symbol and for current measurement a measurement resistor 102. The line resistor of the two-wire current loop 2 is labeled with the reference symbol 103.

Furthermore the inventive bus interface unit 1 is connected to the data bus 5 of the control center computer 100. Send and receive data SD, RD, which can for example feature diagnostic or configuration data, can be exchanged over this bus with the control center computer 100, i.e. with a corresponding processor-supported control unit.

The middle of the upper area of FIG. 1 shows a further inventive bus interface unit 1 which is connected into the two-wire current loop 2. Electrical terminals of the bus interface unit 1 are labeled with the reference symbol 15. The bus interface unit 1 can be connected to a data bus 5 of a distant station not shown in further detail.

The right-hand upper part of FIG. 1 shows an inventive transducer 8, through which the loop current I provided by the analog input module 10 flows in and which then flows back again to the analog input module 10.

The transducer 8 has an input 85 for connection to the two-wire current loop 2 for a measured value MW to be transmitted via the two-wire current loop 2. It also features a current regulator 81 for impressing direct current values of the loop current I corresponding to the measured value MW into the two-wire current loop 2. The current regulator 81 features a display unit 82 for example, which shows a pressure value amounting to 0.25 bar. UK designates a clamping voltage which is present at the transducer 8 for feeding. The minimum clamping voltage typically lies in the range of appr. 7 to 10 V, while the voltage drop over the inventive bus interface unit 1 is comparatively small and is thus not shown in the figure. Internal terminals are labeled with the reference symbol 86, via which the "conventional" current regulator 81 of the transducer 8 is connected to the inventive bus interface unit 1. The bus interface unit 1 can also be connected to a data bus 5 of the transducer 8 or a control unit of the transducer 8 for data exchange.

The left-hand lower part of FIG. 1 shows an inventive analog output module 11. It features a controllable current source 111 for impressing a setpoint value SW to be transmitted over the two-wire current loop 2 and for supplying energy to a connected position controller 9. It also features an inventive bus interface unit 1 connected downstream in series with the controllable current source 111. For energy supply the controllable current source 111 has a power source indicated by a battery symbol. The line resistance of the lower two-wire current loop 2 is labeled with the reference symbol 104. Furthermore the inventive bus interface unit 1 is able to be connected or is connected to the data bus 5 of the control computer 100. Send and receive data SD, RD can be exchanged at the same time over this with the control center computer 100.

The right-hand lower part of FIG. 1 shows an inventive position controller 9, through which the loop current I provided by the analog output module 11 flows inland which then flows back again to the analog output module 11.

The position controller 9 has electrical terminals 95 for connection to the two-wire current loop 2. It also has a setpoint value output for output of a setpoint value SW mapped via the two-wire current loop 2 in the form of a current value. The position controller farther features a current measuring energy decoupling unit 91 connected downstream in series with the two-wire current loop 2. It is used for measurement of direct current values of the loop current I in the two-wire current loop 2 and for supply of energy to an actuator 92 of the position controller 9. In the example depicted in FIG. 1 the actuator 92 is a valve. Connected in series with the current measurement/energy decoupling unit 91 is an inventive bus interface unit 1. The associated internal terminals are labeled with the reference symbol 96. UK once again designates the clamping voltage which is used for supply of power or energy to the position controller 9. The bus interface unit 1 can exchange receive and send data RD, SD especially with a control unit of the position controller 9 via the data bus 5.

Figure 2:
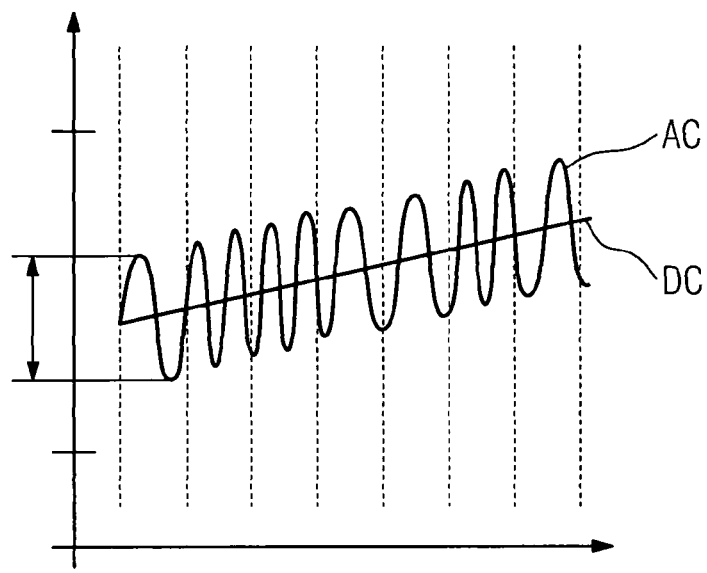

FIG. 2 shows a typical timing waveform of a direct current signal DC of a two-wire loop current I overlaid by an alternating current signal AC. The current amplitude of the alternating current AC typically amounts to 0.8 mA. The alternating current signal AC in this case is greatly magnified by comparison with the current value range of 4 mA to 20 mA of the direct current signal DC for illustration purposes. FIG. 2 also shows the 1200 Hz- or 2200 Hz waveforms which are used for encoding a binary "0"- or "1"-value. In the present example the bit sequence 1001101 of a data word is transmitted.

Figure 3:
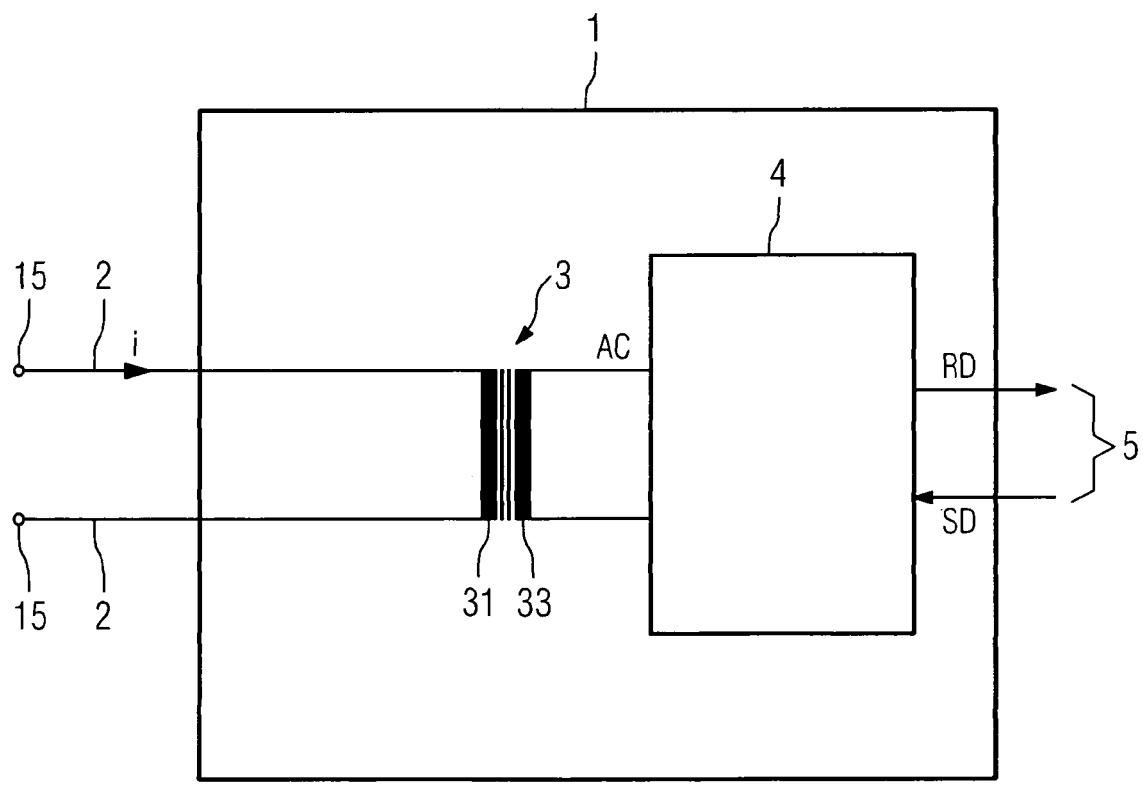

FIG. 3 shows a basic circuit diagram of a bus interface unit 1 according to the prior art. The left-hand part of the bus interface unit 1 shows a transformer 3 with a primary winding 31 and a secondary winding 33 for potential splitting. Connected downstream on the secondary side of the transformer 3 is a bidirectional modem unit 4, which in accordance with the law of induction, is only supplied with the alternating component of the loop current I, meaning the alternating current signal AC, or which in the reverse direction is generated by the modem unit 4 for transmission into the two-wire loop 2. In the right-hand part of FIG. 4 the receive data RD coupled out via the two-wire loop 2 can be output one a data bus 5. Conversely digital send data SD originating from the data bus 5 can be read in by the modem unit 4.

Figure 4:
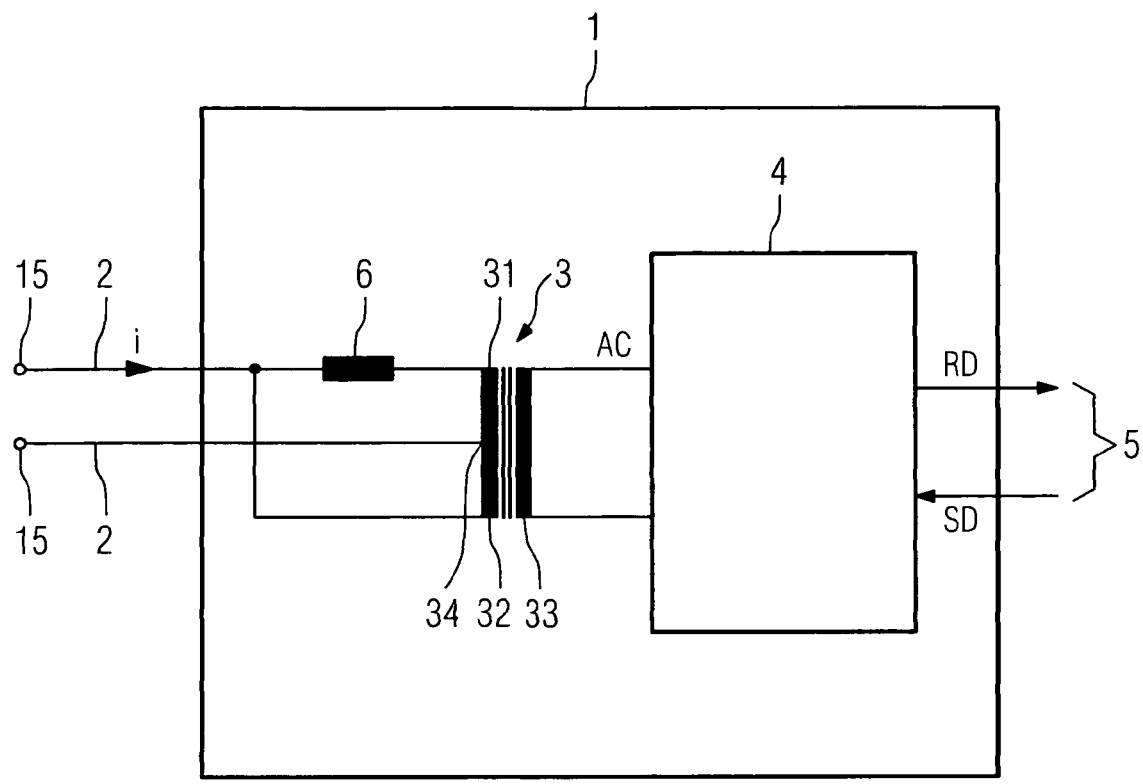

FIG. 4 shows a basic circuit diagram of an inventive bus interface unit 1 in accordance with a first embodiment.

Inventively the transformer 3 features at least two primary coils 31, 32, which are interconnected such that the magnetic fields created in the transformer 3 by the two-wire loop current I flowing through it cancel each other out. A lowpass filter 6 in the form of a choke is connected upstream from one of the primary windings 31, 32. The example depicted in FIG. 4 shows two primary windings 31, 32.

The important fact is that the lowpass filter 6 damps or suppressed the alternating current signal AC in one of the primary windings 31, 32 such that the alternating current signal AC in the other primary windings 32, 31 essentially flows through undamped and can thus induce a corresponding alternating current in the secondary winding 33.

In the example depicted in FIG. 4 the two primary windings 31, 32 are connected in series. The reference symbol 34 identifies the center tap thus produced. The entire loop current I flows back via this, while the loop current I flows in via the respective remaining terminals of the primary windings 31, 32 with around half the current value. The direction of the two primary windings 31, 32 is such that, in the circuit depicted, the created magnetic fields at least largely cancel each other out.

The alternating current signal AC preferably has a current amplitude in the range of appr. 0.8 mA to 1 mA. It preferably also features an FSK frequency of 1200 Hz or 2200 Hz corresponding to the binary values of the digital receive or send data RD, SD. The bidirectional transmission of the receive and send data RD, SD is preferably based on the protocol of a HART® Standard.

The choke 6 is at high resistance for the comparatively high-frequency alternating current signal AC. It blocks or damps this signal so strongly that essentially only the direct current signal DC still flows through the one primary winding 31 here. The choke 6 is thus almost a short circuit for the direct current signal DC with its frequency of 0 Hz and is consequently is very low-resistance.

Figure 5:
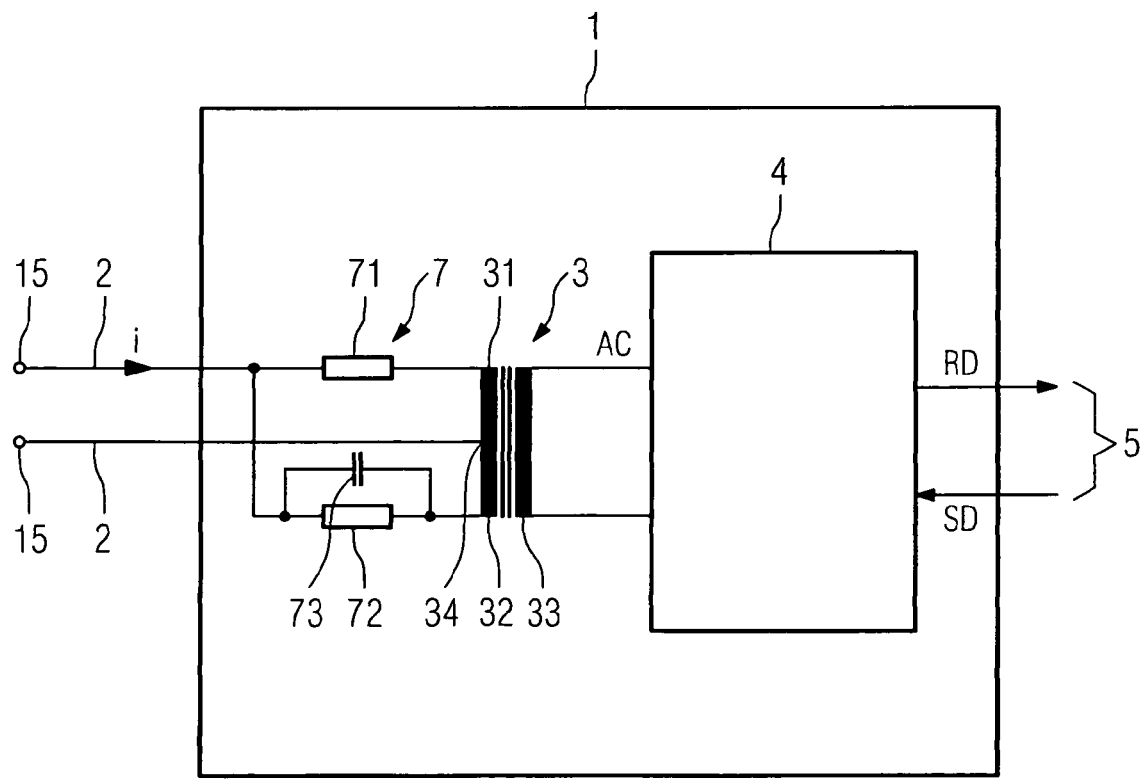

FIG. 5 shows a basic circuit diagram of an inventive bus interface unit 1 in accordance with a second embodiment.

In this case a resistor 71, 72 is connected upstream in each case from the two primary windings 31, 32. Connected in parallel to one of the two resistors 72 is a capacitor 73 which, along with the resistor 72 connected in parallel to it, forms the highpass filter 7. The two resistors 71, 72 preferably have the same resistance value. There is approximately the same voltage drop over the two resistors 71, 72, provided the two primary windings 31, 32 are of essentially the same design. The downstream capacitor 73 in parallel to the resistors 72 acts for the high-frequency "HART®" frequencies like a short circuit. In other words via this capacitor 73 an additional alternating current component is fed past the resistor 72, while the other alternating current components cancel each other out through the two resistors 71, 72 in their effect in the transformer 3. The alternating current signal AC directed via the capacitor 73 in the final analysis causes the induction of a corresponding alternating current on the secondary side of the transformer 3. Preferably the impedance of the two resistors 71, 72 amounts to a multiple of the impedance of the capacitor 73.

IA combination of highpass and lowpass filters 7, 6 not shown is also possible, which in the final analysis has the effect that essentially only the alternating current component AC of the loop current I magnetizes the transformer core. The filters 6, 7 can be 1st-order or higher-order filters.

The invention claimed is:

1. A bus interface unit for intermediate switching in a two-wire current loop, comprising:
   a transformer for potential-free decoupling of an alternating current signal modulated with digital receive data and/or for coupling in an alternating current signal to be modulated with digital send data, wherein the alternating current signal is modulated onto a direct current signal of a two-wire loop current; and
   a bidirectional modem unit connected to the transformer on the secondary side for output of the receive data on a data bus and for input of the send data from the data bus, wherein
   the transformer has two primary windings which are interconnected such that the magnetic fields generated in the transformer by the two-wire loop current flowing through it cancel each other out, and
   a lowpass filter and/or a highpass filter for the alternating current signal is connected upstream from at least one of the primary windings.

2. The bus interface unit as claimed in claim 1, wherein the lowpass filter is a choke.

3. The bus interface unit as claimed in claim 1, wherein a resistor is connected upstream from each of the two primary windings, and wherein a capacitor is connected in parallel to one of the resistors forming the highpass filter along with the resistor connected in parallel.

4. The bus interface unit as claimed in claim 1, wherein the alternating current signal has a current amplitude of max. 1 mA.

5. The bus interface unit as claimed in claim 1, wherein the alternating current signal has a current amplitude of approximately 0.8 mA.

6. The bus interface unit as claimed in claim 1, wherein the alternating current signal has an Frequency Shift Keying frequency of 1200 Hz or 2200 Hz corresponding to the binary value of the digital receive data or send data.

7. The bus interface unit as claimed in claim 1, wherein the two-wire current loop is provided for transmission of a measured value or of a setpoint value, of which the respective measured value range is able to be mapped by corresponding direct current values of the loop current in a range of 4 mA to 20 mA.

8. The bus interface unit as claimed in claim 1, wherein the bus interface unit is integrated in a transducer for connection to a two-wire current loop with a measured value input for a measured value to be transmitted via the two-wire current loop and with a current regulator for impressing direct current values of the loop current corresponding to the measured value into the two-wire current loop, wherein the bus interface unit is connected in series with the current regulator, and wherein the bus interface unit is connected to a data bus of the transducer.

9. The bus interface unit as claimed in claim 3, wherein the impedance of the two resistors amounts to multiple of the impedance of the capacitor.

10. The bus interface unit as claimed in claim 4, wherein the bidirectional data transmission is based on a protocol of a HART Standard.

11. The bus interface unit as claimed in claim 5, wherein the bidirectional data transmission is based on a protocol of a HART Standard.

12. A position controller for connection to a two-wire current loop, wherein a setpoint value output for output of a setpoint value via the two-wire current loop mapped in the form of a current value, comprising:
a downstream current measurement unit or energy decoupling unit connected in series with the two-wire current loop for measurement of direct current values of the loop current in the two-wire current loop and for supply of energy to an actuator of the position controller;
a bus interface unit for intermediate switching in the two-wire current loop having a transformer for potential-free decoupling of an alternating current signal modulated with digital receive data and/or for coupling in an alternating current signal to be modulated with digital send data, wherein the alternating current signal is modulated onto a direct current signal of a two-wire loop current, and having a bidirectional modem unit connected to the transformer on the secondary side for output of the receive on a data bus and for input of the send data from the data bus, wherein the transformer has two primary windings which are interconnected such that the magnetic fields generated in the transformer by the two-wire loop current flowing through it cancel each other out, wherein a filter for the alternating current signal is connected upstream from at least one of the primary windings, and wherein the bus interface unit is connected in series with the current measurement unit or the decoupling unit; and
a data bus, wherein the bus interface unit is connected to the data bus.

13. The position controller as claimed in claim 12, wherein the filter is a lowpass filter.

14. The position controller as claimed in claim 12, wherein the filter is a highpass filter.

15. An analog interface module for a control center computer, comprising:
a bus interface unit for intermediate switching in the two-wire current loop having a transformer for potential-free decoupling of an alternating current signal modulated with digital receive data and/or for coupling in an alternating current signal to be modulated with digital send data, wherein the alternating current signal is modulated onto a direct current signal of a two-wire loop current, and having a bidirectional modem unit connected to the transformer on the secondary side for output of the receive on a data bus and for input of the send data from the data bus, wherein the transformer has two primary windings which are interconnected such that the magnetic fields generated in the transformer by the two-wire loop current flowing through it cancel each other out, wherein a filter for the alternating current signal is connected upstream from at least one of the primary windings, and wherein the bus interface unit is connected to a data bus of the control center computer.

16. The analog interface module as claimed in claim 15, wherein the filter is a lowpass filter.

17. The analog interface module as claimed in claim 15, wherein the filter is a highpass filter.

18. The analog interface module as claimed in claim 15, wherein the analog interface module is an input module having a current measurement unit or an energy supply unit for recording measured values transmitted over a two-wire current loop and for supplying energy to a connected transducer, and wherein the bus interface unit is connected in series with the current measurement unit.

19. The analog interface module as claimed in claim 15, wherein the analog interface module is an input module having a current measurement unit or an energy supply unit for recording measured values transmitted over a two-wire current loop and for supplying energy to a connected transducer, and wherein the bus interface unit is connected in series with the decoupling unit.

20. The analog interface module as claimed in claim 15, wherein the analog interface module is an output module having a controllable current source for impressing a setpoint value to be transmitted over a two-wire current loop and for supplying energy to a position controller, and wherein the bus interface unit is connected in series with the controllable current source.

* * * * *